United States Patent [19]

Trumbo et al.

[11] Patent Number: 5,756,573
[45] Date of Patent: May 26, 1998

[54] SEED POLYMERIZED LATEX POLYMER HAVING A GRADIENT POLYMERIC MORPHOLOGY AND PROCESS FOR PREPARING THE SAME

[75] Inventors: David L. Trumbo, Racine, Wis.; John Biale, Anaheim, Calif.

[73] Assignee: SC Johnson Commerical Markets, Inc., Sturtevant, Wis.

[21] Appl. No.: 539,808

[22] Filed: Oct. 5, 1995

[51] Int. Cl.$^6$ .................................................. C08L 9/08
[52] U.S. Cl. ........................... 524/458; 524/460; 524/832
[58] Field of Search ................................... 524/458, 460, 524/832; 523/201

[56] References Cited

U.S. PATENT DOCUMENTS

| | | | |
|---|---|---|---|
| 3,562,235 | 2/1971 | Ryan | 260/885 |
| 3,687,923 | 8/1972 | Thomas et al. | 260/92.8 R |
| 3,804,881 | 4/1974 | Bassett et al. | 260/470 A |
| 4,039,500 | 8/1977 | Bassett et al. | 260/29.7 R |
| 4,111,876 | 9/1978 | Bailey et al. | 260/29.7 RB |
| 4,122,136 | 10/1978 | Korte et al. | 260/898 |
| 4,173,600 | 11/1979 | Kishida et al. | 525/76 |
| 4,515,914 | 5/1985 | Tsurumi et al. | 523/201 |
| 4,742,108 | 5/1988 | Makati et al. | 524/458 |
| 5,189,107 | 2/1993 | Kasai et al. | 525/264 |
| 5,340,859 | 8/1994 | Aydin et al. | 524/458 |
| 5,352,720 | 10/1994 | Aydin et al. | 524/458 |

FOREIGN PATENT DOCUMENTS

| | | |
|---|---|---|
| 04 053 803 | 2/1992 | Japan . |
| 1179331 | 1/1970 | United Kingdom ............ C08F 15/00 |

Primary Examiner—Jeffrey T. Smith
Attorney, Agent, or Firm—Richard E. Rakoczy, Esq

[57] ABSTRACT

A seed polymerized latex polymer having a gradient polymeric morphology surrounding a latex seed core having a number average core size in the range from about 20 nanometers to about 60 nanometers is described. Also described is the process for preparing the seed polymerized latex polymer having a gradient polymeric morphology.

24 Claims, 1 Drawing Sheet

SEED POLYMERIZED LATEX POLYMER HAVING A GRADIENT POLYMERIC MORPHOLOGY AND PROCESS FOR PREPARING THE SAME

BACKGROUND OF THE INVENTION

1. Field of the Invention

This invention relates to a process for preparing a latex polymer having a latex seed core surrounded by a polymeric layer having a gradient polymeric morphology. The invention further relates to the latex polymer prepared by this process and the use thereof in wood coatings having excellent early print resistance.

2. Related Background Art

The preparation of latex polymers by emulsion polymerization has long been known. Such latex polymers are extensively used in adhesives and coatings, such as decorative or protective wood coatings, paints and the like. The performance of latex polymers in such applications is dependent upon the polymeric composition, the uniformity of particle size and polymeric morphology. Many techniques have been described that attempt to control these parameters to provide a latex polymer having improved performance.

For example, U.S. Pat. No. 5,189,107, U.S. Pat. No. 4,122,136 and U.S. Pat. No. 3,687,923, disclose that latex polymers having uniform particle size can be obtained by using latex seeds in the polymerization reaction. U.S. Pat. No. 3,562,235 discloses modifying the polymeric morphology of latex polymers in a step wise fashion by introducing different monomers at different stages of the polymerization reaction. A three-stage step wise addition process in combination with a polystyrene seed latex is disclosed by U.S. Pat. No. 4,742,108. This patent attempts to obtain a latex having high tensile strength without loss of elongation by employing a second stage monomer feed having a higher glass transition temperature than the first and third stage monomer feeds. U.S. Pat. No. 4,515,914 attempts to prepare highly coalescence-capable and deformable latexes using a two stage polymerization process resulting in a copolymer core and a shell of linear styrene. This patent suggests, but does not exemplify, the use of a seed latex in such a process. None of these references disclose or suggest a process for preparing a latex polymer having a gradient polymeric morphology.

U.S. Pat. No. 3,804,881 discloses a process for preparing latex polymers having a gradient polymeric morphology by continuously introducing a primary polymerizable feed composition from a primary feed source to a polymerization zone while continually varying the compositional content of the primary feed source by continually adding a secondary polymerizable feed composition to the primary feed source. This process can be used to prepare polymers having a broad glass transition temperature by emulsion polymerizing a continually varying composition of hard and soft monomers. This patent also discloses the use of three separate polymerizable feed mixtures in which a first feed mixture is initially added to the polymerization reactor prior to the introduction of the primary polymerizable feed composition from the primary feed source. There is no disclosure or suggestion, however, of introducing a seed latex having a critical average particle size prior to continuously varying the composition content in the polymerization reactor to obtain a latex polymer having a highly uniform particle size with a seed core surrounded by a polymeric layer having a gradient polymeric morphology.

A process similar to that of U.S. Pat. No. 3,804,881 is disclosed by U.S. Pat. No. 4,039,500 along with the use of a chain transfer agent in an attempt to control particle morphology and to broaden the molecular weight distribution of emulsion polymerized latex polymers. U.S. Pat. No. 4,111,876 discloses a process for preparing a nonuniform polymeric material comprised of acrylonitrile, styrene and acrylate ester which is said to be a good impact modifier for poly(vinylchloride) resin compositions. Neither of these references disclose or suggest the use of a seed latex.

SUMMARY OF THE INVENTION

This invention is directed to an emulsion addition-polymerization process for preparing a seed polymerized latex polymer having a polymer layer with a gradient polymeric morphology. The process comprises (a) introducing latex seed particles having a number average particle size in the range from about 20 nanometers to about 60 nanometers, preferably about 25 nanometers to about 40 nanometers, to an emulsion polymerization reaction zone, (b) introducing a first monomer feed composition and a second monomer feed composition simultaneously to the emulsion polymerization reaction zone under addition-polymerization conditions, the first monomer feed composition and the second monomer feed composition each having at least one polymerizable reactant wherein a polymer of the at least one polymerizable reactant of the first monomer feed composition would have a glass transition temperature $T_{g1}$ differing from a glass transition temperature $T_{g2}$ of a polymer of the at least one polymerizable reactant of the second monomer feed composition, (c) polymerizing the at least one polymerizable reactant of each of the first monomer feed composition and the second monomer feed composition upon introduction to the emulsion polymerization reaction zone, and (d) continuously varying the concentration ratio of the first monomer feed composition to the second monomer feed composition simultaneously introduced to the emulsion polymerization reaction zone. The emulsion polymerization reaction zone contains a surfactant and initiator in an aqueous solution. The surfactants and initiators useful in this invention are well known to those of ordinary skill in the art.

The conditions necessary to achieve addition-polymerization in the emulsion polymerization reaction zone are well known to those of ordinary skill in the art. Generally the reaction zone is heated to a desired reaction temperature in a range from about 40° C. to about 150° C., more preferably from about 50° C. to about 90° C., most preferably from about 75° C. to about 85° C., over a predetermined period of time. In addition, an inert gas, such as nitrogen, may be introduced into the head space of the reaction zone to eliminate oxygen from the reaction zone, if desired.

The monomer feed compositions may contain a single polymerizable reactant or multiple polymerizable reactants, any of which may be selected from polymerizable monomers or reactants well known in emulsion addition-polymerization. The monomer feed compositions may also contain a crosslinking agent such as, for example, divinylbenzene or 1,6-hexanediol diacrylate. The polymerizable reactant content of the first monomer feed composition and the second monomer feed composition are different although each may share like monomers or reactants in differing amounts if multiple reactants are present. The glass transition temperature $(T_g)$ of the polymers which can be formed from the first monomer feed composition $(T_{g1})$ and the second monomer feed composition $(T_{g2})$ will be different, i.e., a polymer of the first monomer feed composition would have a $T_{g1}$ differing from a $T_{g2}$ of a polymer of the second monomer composition. Typically the difference between $T_{g1}$ and $T_{g2}$ is greater than 5° C., more preferably greater than 25° C. and most preferably greater than 100° C. This difference may be achieved through the selective use of hard monomers and soft monomers as is well known to those of ordinary skill in the art.

The concentration ratio of the first monomer feed composition to the second monomer feed composition introduced to the emulsion polymerization reaction zone during step (b) is continuously varied to create a gradient polymeric morphology, i.e., a polymeric layer having a continually changing monomeric compositional content. This polymer layer surrounds or encapsulates the latex seed particles. In addition, the polymer layer having a gradient polymeric morphology lacks a definable glass transition temperature $(T_g)$ because of the continuously changing monomeric compositional content across the polymer layer formed. The process of this invention also includes introducing monomer feed compositions to the reaction zone prior and/or subsequent to the formation of the polymeric layer having a gradient polymeric morphology. Such monomer feed compositions can be the same or different than the first or second monomer feed compositions.

The means of varying the concentration ratio of the first monomer feed composition to the second monomer feed composition are varied. For example, a preferred means, as illustrated in FIG. 1, is to employ a primary feed source 1 containing a first monomer feed composition which feeds into a reaction zone 2 and a secondary feed source 3 containing a second monomer feed composition which simultaneously feeds into the primary feed source, i.e., a series feed, such as disclosed by U.S. Pat. No. 3,804,881, the disclosure of which is incorporated by reference herein. Another means of continuously varying the concentration ratio of the first monomer feed composition to the second monomer feed composition illustrated in FIG. 2 comprises feeding both compositions from a first primary feed source 4 and a second primary feed source 5, respectively, directly into the reaction zone 2, i.e., a parallel feed, while continually changing the feed rate of at least one of the monomer feed compositions. If desired, the feed rates of both monomer feed compositions can be continuously varied, such as for example in an inverse manner. Gradually and continuously raising or lowering the feed rate of a monomer feed composition can be achieved using adjustable valves in combination with computer control, if desired. Such process control systems are available and can readily be programmed by one of ordinary skill in the art to obtain a continuously varying feed rate.

The present invention is also directed to a seed polymerized latex polymer having a gradient polymeric morphology comprising a latex seed core having a number average particle size in the range from about 20 nanometers to about 60 nanometers, preferably 25 manometers to about 40 nanometers and a polymeric layer having a gradient polymeric morphology surrounding the core. Generally, the seed polymerized latex polymers of this invention have a number average particle size less than 100 nanometers, preferably in a range from about 55 nanometers to about 95 nanometers, most preferably 60 nanometers to about 90 nanometers.

The seed polymerized latex polymers, which are prepared by the process of this invention, can be advantageously employed in wood coatings to give cured films having excellent early print resistance. The seed polymerized latex polymers of this invention may also be used to prepare excellent gloss coatings.

DETAILED DESCRIPTION OF THE INVENTION

Figure 1:
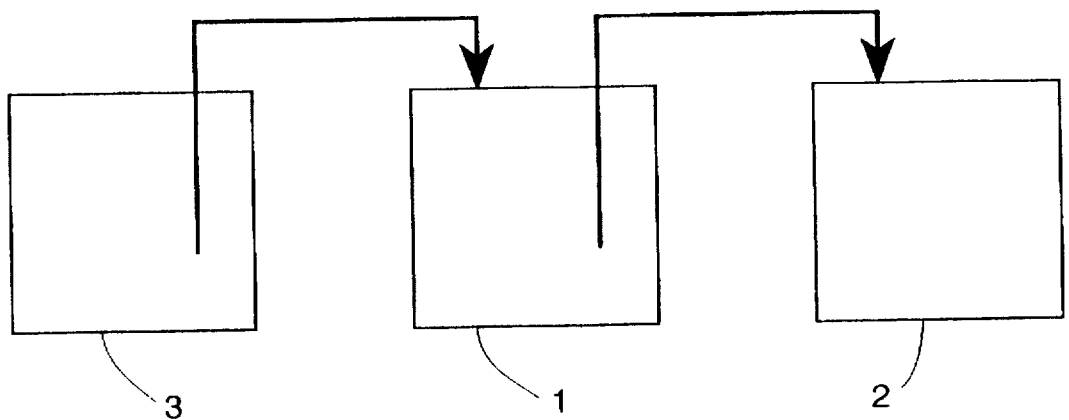
FIG. 1 is a block diagram illustrating a series feed embodiment of the process of this invention.
Figure 2:
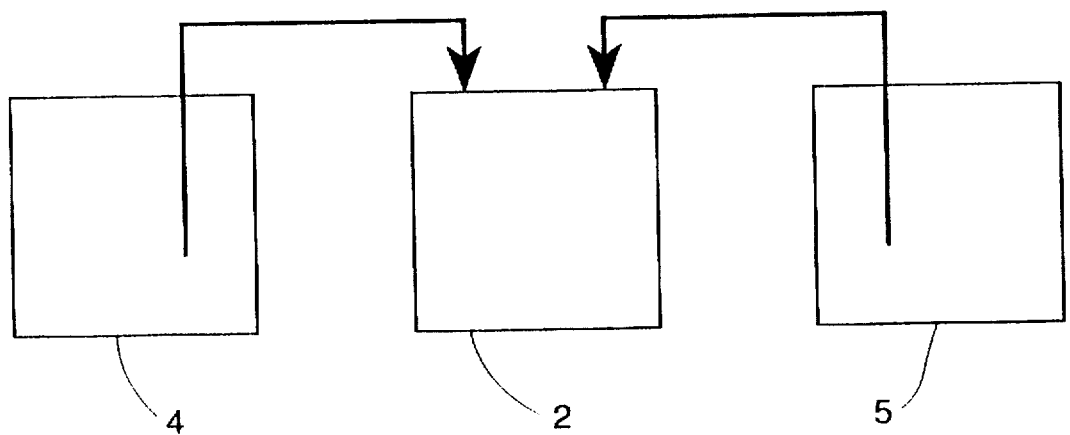
FIG. 2 is a block diagram illustrating a parallel feed embodiment of the process of this invention.

The process of this invention employs latex seed particles having a number average particle size in the range from about 20 nanometers to about 60 nanometers. The preparation of such latex seed particles is well known to those skilled in the art. The latex seed particles used in this invention may be prepared using a single monomer or a mixture of monomers. A crosslinking agent may also be used if desired. A preferred latex seed particle of this invention is comprised of styrene and about 5% by weight of a divinylbenzene crosslinking agent. Preferably, this polystyrene latex seed has a number average particle size of 25 to 40 nanometers and most preferably of 33 to 35 nanometers. However, any latex seed particle within the above defined number average particle size range may be employed which allows for the preparation of the seed polymerized latex polymers of this invention.

The particle size of the latex seed particles and the prepared latex polymers of this invention are typically measured using a QELS (quasi elastic light scattering) technique to provide a number average particle size having a distribution of plus or minus about 2 nanometers. QELS is a well known technique to those skilled in the art. Other known particle size measurement techniques which may be employed, if desired, include capillary hydrodynamic fractionation or size exclusion chromatography.

Emulsion polymerizing with the above described latex seed particles by continuously varying the concentration ratio of a first monomer feed composition and a second monomer feed composition in an emulsion polymerization reaction zone produces latex polymers with a highly uniform particle size and a polymeric layer having a gradient polymeric morphology. These latex polymers may be advantageously employed, for example, in wood coatings to give films having excellent early print resistance. Early print resistance is highly desired by manufacturers employing wood coatings on various substrates, such as furniture, because it determines how rapidly the coated substrates may be stacked for storage and thus ultimately affects the manufacturer's line speed.

The emulsion polymerization reaction zone used in this invention is any reactor, properly equipped, that can be used for the production of emulsion polymers. The different types of reactors and their suitability for a particular emulsion addition-polymerization reaction are well known to those skilled in the art.

At least one primary feed source is connected to the polymerization zone or reactor. The term primary feed source defines one or more tanks or source of polymerizable reactants feeding directly into the polymerization zone or reactor. For example, it can be an in-line mixer or a tank. The primary feed source is equipped with efficient mixing means to assure adequate mixing of the monomer contents thereof. Preferably, the primary feed source contains a preemulsion of polymerizable reactant in a range from about 30 to 50% by weight solids, although any amount of polymerizable reactants may be used that provides a stable preemulsion. The preemulsion may be an aqueous emulsion of the monomers to be reacted which have been dispersed through the assistance of a surfactant, and optionally a homogenizer. Such preemulsions are readily prepared by those of ordinary skill in the art.

A significant aspect of the process of this invention is continually varying the concentration ratio of a first monomer feed composition to a second monomer feed composition in the reaction zone to form a polymeric layer having a gradient polymeric morphology. As previously noted this can be achieved through at least two different embodiments, i.e., (i) a series feed—the use of a secondary feed source connected to the primary feed source or by (ii) a parallel feed—continually varying the feed rate of at least one of two primary feed sources connected to the reaction zone in parallel.

In the former embodiment, i.e., the series feed, the secondary feed source may be one or more tanks or sources of polymerizable reactants feeding to any of the primary feed sources. There can be one or more secondary feed sources with all of the secondary feed sources feeding directly into the primary feed source, or one or more of the secondary feed source can feed in series to another secondary feed source and be thoroughly mixed therein with finally an ultimate secondary feed source feeding directly into one or more of the primary feed sources. The rate of feed from any one feed source to any other feed source or tank, whether primary or secondary, can be varied. While there are many possible configurations, in this preferred embodiment there must be a polymerization zone or reactor connected to at least one primary feed source or tank equipped with mixing means which in turn is connected to at least one secondary feed source or tank. The secondary feed source or sources (when more than one thereof is used) can all or in part feed directly into one or more of the primary feed source or tank or can feed in series into one another and ultimately feed into the primary feed source or tank.

The first monomer feed composition is a single polymerizable reactant or mixture of polymerizable reactants initially present in the primary feed source or tank. This first monomer feed composition can contain the polymerizable reactants, chain transfer agents and crosslinkers, or it can include any other additive which will not have a deleterious effect on the polymerizable reactants. Such additives include, for example, diluents or solvents, colorants, dispersion or emulsion agents, antioxidants, stabilizers, catalysts or initiators, and the like.

If a secondary feed source is employed, such as in the series feed embodiment of this invention, then the compositional content of the primary feed source is continually changing as the second monomer feed composition is fed into and mixed with the first monomer feed composition. The term compositional content means the content or concentration of the polymerizable monomers or reactants contained in the feed source at any given time. The simultaneous feed of first monomer feed composition from the primary feed source to the polymerization reaction zone and feeding of a different second monomer feed composition from the secondary feed source to the primary feed source results in a continual change of the content or concentration of each reactant present in the primary feed source and thus a continuously varying concentration ratio of the first monomer feed composition to the second monomer feed composition introduced to the reaction zone. This continual change in compositional content can also occur in the secondary feed source when more than one thereof is being used and they are feeding in series into each other before ultimately feeding into the primary feed source. The second monomer feed composition is a single polymerizable reactant or mixture of polymerizable reactants initially present in any one or more of the secondary feed sources or tanks and can contain the same types of additives that were previously indicated would be present in the first monomer feed composition.

The polymerizable monomers or reactants employed in the process of this invention are polymerizable ethylenically unsaturated monomers or reactants. The first monomer feed composition can initially contain a single polymerizable reactant or it can initially contain a plurality of polymerizable reactants; the same is true for the initial content of the second monomer feed composition. However, when the first monomer feed composition is a single monomer reactant the secondary polymerizable feed composition cannot be solely that same single monomer reactant, but it can be a different single monomer reactant or a mixture of a plurality of monomer reactants that can include that same monomer reactant in the mixture. Likewise, when the first monomer feed composition is a mixture of a plurality of monomer reactants the second monomer feed composition cannot be that same mixture having the same concentrations for each reactant, but it can be a different mixture of monomer reactants or it can be a mixture of the same monomer reactants but at different initial concentrations of the monomer reactants. A significant and critical aspect of this process is that the initial compositional contents of the first monomer feed composition and of the second monomer feed composition are always different, i.e., they are not initially identical.

Thus in the series feed embodiment of this invention, as a result of the initial differences in the compositional contents of the first and second monomer feed compositions and because of the simultaneous addition of the second monomer feed composition to the first monomer feed composition while the contents of primary feed source are introduced into the polymerization zone, there is a continuously varying concentration ratio and compositional content of the first monomer feed composition and the second monomer feed composition in the reaction zone. Hence, any portion of the contents of the primary feed source entering the polymerization zone is at all times different than the portion that preceded it and the portion that succeeds it. Consequently, the composition of the polymer produced in the reactor during the addition is likewise continuously changing and reflects the concentration ratio of the first monomer feed composition to the second monomer feed composition entering the polymerization zone. Because of this constantly changing monomer mixture, the process of this invention can be employed to prepare novel seed polymerized latex polymer compositions having a polymer layer with a gradient polymeric morphology surrounding the seed core.

The series feed embodiment of the emulsion polymerization process of the invention can be described in its simplest form by a reaction involving a single primary feed source initially containing a single polymerizable monomer reactant. Secondary feed source feeds into primary feed source by suitable lines and pumps. The primary feed source is equipped with an efficient stirrer or mixer and feeds into the polymerization zone. At the start of the emulsion polymerization reaction the polymerization zone or reactor is charged with the requisite amount of water, initiator or catalyst, surfactant and latex seed particles. The flow of the first monomer feed composition from the primary feed source to the polymerization zone is commenced at a predetermined rate. Simultaneously, or preferably after some predetermined delay, the flow of the second monomer feed composition from the secondary feed source to the primary feed source is initiated and this rate of flow can be the same as or different than the rate of flow from the primary feed source to the polymerization zone. As the second monomer feed composition enters the primary feed source it is thoroughly mixed with the contents thereof resulting in a continual increase in concentration of the polymerizable reactants contained in the secondary feed source. This results in a continual change in the compositional content of the polymerizable reactants contained in the primary feed source. This continually changing contents of the primary feed source is simultaneously and continuously entering the polymerization zone and as the polymer is produced therein it varies in polymeric morphology in accordance with the compositional content of the mixture of polymerizable reactants in the polymerization zone. Of course, the primary or secondary feed source can contain more than one polymerizable reactant.

The variations in the engineering arrangements of the primary and secondary feed sources are innumerable and no attempt will be made to set forth each specific tank configuration or arrangement possible; these can readily be devised by those skilled in the art for the purpose of obtaining maximum operational efficiency or for the purpose of obtaining product having certain desired properties.

As noted above, the simplest arrangement of a series feed embodiment employs a single primary feed source and a single secondary feed source. Slightly more complex arrangements would be those where there was a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding in directly into the primary feed source. Other arrangements could be those wherein there were a plurality of primary feed sources; in these instances there could be a single secondary feed source feeding into one or more of the plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary feed sources. When a plurality of secondary feed sources are used they can be employed in any combination desired. For example, all can be used in series or some can be used in series with all of them being added directly to the primary feed source. In all instances the primary feed sources feed the contents thereof to the polymerization zone;

the secondary feed sources feed the second monomer feed composition directly to the primary feed source or in series to another secondary feed source with the reactants therein ultimately terminating in the primary feed source before entering the polymerization zone. During the movements of reactants from one feed source to another there is a resultant continual change in the compositional content of the contents of the tank or reactors to which polymerizable reactant is added and the contents of the tanks or reactors are agitated to obtain efficient mixing of the contents therein. One can also vary the process by having periods of time at the start, during or near the end of the reaction wherein there is feeding of a first monomer feed composition from the primary feed source into the polymerization reactor without any simultaneous feed from the secondary feed source into the primary feed source or tank for a selected period of time. In addition, the flow rates between feed tanks or the polymerization zone can be varied at will at any time during the polymerization reaction.

As previously noted, a second embodiment of the process of this invention, i.e., a parallel feed, is directed to varying the concentration ratio of the first monomer feed composition to the second monomer feed composition using at least two primary feed sources directly connected to the reaction zone and continuously varying the feed rate of at least one of the primary feed sources so that the compositional content of the monomer reactants introduced into the reaction zone is continually changing. In this embodiment there is no need for a secondary feed source although one or more could be used if desired. In the most simple case, a first primary feed source contains a first monomer feed composition comprised of a single polymerizable reactant and a second primary feed source contains a second monomer feed composition comprised of a different single polymerizable reactant. As the first monomer feed composition of the first primary feed source is introduced to the reaction zone at a constant feed rate the introduction of the second monomer feed composition from the second primary feed source is initiated, simultaneously or after some predetermined delay, at a feed rate which is continuously raised or lowered so that the compositional content of the polymerizable reactants introduced to the reaction zone is continually changing. Of course, the first monomer feed composition and the second monomer feed composition may be comprised of multiple polymerizable reactants. If desired, the feed rate of the first primary feed source and the second primary feed source can both be continuously varied so long as the concentration ratio of the first monomer composition to the second monomer composition introduced to the reaction zone continuously varies. It is also possible to use additional primary feed sources, the feed rate of which may be varied or remain constant. The contents of the primary feed sources may also be directed at the appropriate feed rate through an in-line mixer which feeds the mixture directly to the reaction zone. The variation of feed rates from the primary feed sources to the reaction zone or in-line mixer can be achieved using known means, such as variable feed valves in conjunction with a computer control system. Such variable feed valves are readily available, while the control thereof by a computer processor could readily by programmed by one of ordinary skill in the art.

The processes of this invention can be used to emulsion polymerize any mixture of polymerizable reactants that will co-react or copolymerize with each other at a rate such that there is no substantial build-up of any one reactant or group of reactants while the other reactants are reacting and forming an emulsion latex polymer. The invention includes any group or class of polymerizable reactants capable of chain-growth addition polymerization.

The concentrations of a particular polymerizable reactant initially present in the primary feed source or initially present in the secondary feed source can vary from 0.01 weight percent to 100 weight percent based on the total weight of polymerizable reactants initially present in the particular feed composition. These concentrations can be varied at the will of the skilled individual, as is recognized in the art, to obtain the particular final concentrations of each reactant in the emulsion latex or to obtain a particular property or characteristic in the latex polymer. The process employs the temperature and pressure conditions which are known to be suitable for the reactants employed in emulsion polymerizations.

Among the polymerizable reactants that can be used in producing seed polymerized latex polymers having a gradient polymeric morphology by the processes of this invention are those containing at least one polymerizable carbon-to-carbon unsaturated bond, i.e., polymerizable ethylenically unsaturated monomers. These compounds are well known and include, for example, $C_2$ to $C_{20}$ alkenes, $C_3$ to $C_{20}$ alkadienes, $C_5$ to $C_{20}$ alkatrienes, $C_5$ to $C_{20}$ cycloolefins, vinyl substituted aromatics, acrylic or methacrylic acid, $C_1$ to $C_{20}$ alkyl esters of acrylic acid or methacrylic acid, $C_6$ to $C_{20}$ aryl esters of acrylic or methacrylic acid, $C_7$ to $C_{20}$ aralkyl esters of acrylic or methacrylic acid and the like.

More particularly, such ethylenically unsaturated monomers include, without limitation, ethylene, propylene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 4-methoxy-3-methylstyrene, 4-chlorostyrene, 3,4-dimethylalphamethylstyrene, 3-bromo-4-methyl-alphamethylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxpypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alphachloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly (ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethane, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinylether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl)maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrrolidone, N-vinyl carbazole, N(vinyl benzyl)-pyrrolidine, N-(vinyl benzyl)piperidine, 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide and the like.

Additional exemplary ethylenically unsaturated monomers which are suitable crosslinking agents for use in this invention include, without limitation, divinyl benzene, ethylene glycol diacrylate, ethylene glycol dimethacrylate, trimethylol propane triacrylate, trimethylol propane trimethacrylate, pentaerythritol triacrylate, pentaerythritol trimethacrylate, allyl acrylate, allyl maleate, allyl methacrylate, diallyl maleate, polyethylene glycol diacrylate and polyethylene glycol dimethacrylate and the like.

The polymerizable feed compositions and the polymerization reaction zone can contain in the usual known amounts, dispersion aids, emulsifiers, photosensitizers, colorants, initiators, catalysts, chain transfer agents and other additives conventionally used in polymerization reactions, all of which are known, as are their uses.

Any of the known dispersion agents can be used at the conventional concentrations, including, for example, hydroxyethyl cellulose, carboxymethyl cellulose, poly(vinyl alcohol), methyl cellulose, sulfated cellulose, and the like.

Any of the known emulsifiers or surfactants can be used at a total concentration preferably between about 1.0 and about 1.8 percent by weight based on the total weight of polymerizable reactants charged. These include anionic, cationic, nonionic and copolymerizable surfactants, with anionic surfactants being most preferred. Among the useful emulsifying agents there are included soaps, sulfonated alkylbenzenes, alkylphenoxyethyl sulfonates, sodium lauryl sulfonate, salts of long chain amines, salts of long chain carboxylic or sulfonic acids, alkylphenol ethoxylates, linear alcohol ethoxylates, or any other emulsifying agent or surfactant. Typically, a range of about 20 to about 100 percent by weight of the emulsifiers or surfactants may be charged to the reaction zone and about 0 to about 80 percent weight may be used in the polymerizable feed compositions.

Any of the known initiators may be used. These include without limitation, persulphate salts such as ammonium persulphate, potassium persulphate or sodium persulphate, 2,2'-Azobisisobutyronitrile (AIBN), organic peroxides and the like. While initiators may be present in the polymerizable feed compositions, they are most preferably employed in the initial charge of the polymerization reaction zone and by addition thereto by an aqueous cofeed in amounts well known to those skilled in the art.

Any of the known chain-transfer agents may be used including for example, butyl mercapto propionate; iso octyl mercapto propionic acid; iso octyl mercapto propionate ("IOMP"); bromoform; bromotrichloromethane ("BTCM"); carbon tetrachloride; alkyl mercaptans such as n-dodecyl mercaptan, tertiary-dodecyl mercaptan, octyl mercaptan, tetradecyl mercaptan, and hexadecyl mercaptan; monothioglycerol; alkyl thioglycolates such as butyl thioglycolate, iso octyl thioglycolate, and dodecyl thioglycolate; thioesters; and combinations thereof.

This invention is also directed to the seed polymerized latex polymers having a polymer layer with a gradient polymeric morphology surrounding the seed core or particle and which can be prepared by the process of this invention. Thus the novel latex polymer of this invention can be prepared for example, by charging to a polymerization reaction zone a mixture of latex seed particles having a number average particle size in the range of about 20 nanometers to about 60 nanometers, preferably about 25 nanometers to about 40 nanometers, water, initiator and surfactant or emulsifying agent. Next, a primary feed source of a first monomer feed composition containing the selected polymerizable ethylenically unsaturated monomers and optionally a crosslinker is prepared, preferably in a preemulsion. There is also prepared in a secondary feed source a second monomer feed composition of selected ethylenically unsaturated monomers. The contents of the polymerization zone are heated to the desired reaction temperature and the monomers feeds are started. Generally the reaction temperature is in a range from about 40° C. to about 150° C., more preferably about 50° C. to about 90° C. and most preferably from about 75° C. to about 85° C. A pressurized reactor is used for temperatures above about 100° C. The contents of the primary feed source are introduced into the polymerization zone at a selected rate and simultaneously, or after a predetermined delay, the contents of the secondary feed source are introduced into the primary feed source at a selected rate and thoroughly mixed therein. At the completion of the addition of the primary feed source contents to the polymerization reaction zone, the contents thereof are stirred for an additional period of time and thereafter the seed polymerized latex polymer having a polymer layer with a gradient polymeric morphology is recovered.

INDUSTRIAL APPLICABILITY

The seed polymerized latex polymers of this invention are prepared by employing a first monomer feed composition and a second monomer feed composition which if polymerized separately would result in polymers having different glass transition temperatures. This is readily achieved through the use and selective combination of soft monomers and hard monomers in the polymerizable feed compositions. A soft monomer means a monomer which would form a homopolymer having a $T_g$ of less than about 25° C., while a hard monomer means a monomer which would form a homopolymer having a $T_g$ greater than about 25° C. The use of different combinations and concentrations of soft and hard monomers can be employed to engineer a particularly desired polymeric morphology. For example, the inclusion of a greater amount of hard monomers in the second monomer feed composition used in preparing the seed polymerized latex by the series feed embodiment of this invention results in a polymer layer having a gradient polymeric morphology which continuously increases in hard monomer concentration towards the surface of the particle. Of course, a seed polymerized latex polymer could also be prepared having a polymer layer with a gradient polymeric morphology that increases in soft monomer concentration moving to the outer surface of the layer.

Preferably, the seed polymerized latex polymer of this invention is prepared with a polystyrene latex seed having a number average particle size of about 20 to about 60 nanometers, preferably about 25 to about 40 nanometers and most preferably about 33 to about 35 nanometers. A particularly preferred seed polymerized latex polymer having a polymer layer with a gradient polymeric morphology has been found to be highly advantageous for use in wood coating compositions due to the excellent early print resistance of the films containing that polymer.

The preferred seed polymerized latex polymer of this invention may be prepared, for example, by a series feed embodiment of the process of this invention using a first monomer feed concentration having a greater concentration of soft monomer than the second monomer feed composition, i.e., $T_{g2}$ is greater than $T_{g1}$. In such a case, a highly preferred first monomer feed composition is comprised of 2-ethylhexyl acrylate, methacrylic acid, divinylbenzene, a surfactant and water in the form of a preemulsion. Most preferably, the first monomer feed composition is fed to the reaction zone prior to feeding the second monomer feed composition to the primary feed source for a brief period of time. This results in a uniform polymer layer surrounding the seed particle prior to polymerizing the polymer layer having a gradient polymeric morphology. A highly preferred second monomer feed composition having a greater concentration of hard monomers than the first composition is comprised of styrene, methyl methacrylate, acrylic acid, methacrylic acid and divinyl benzene. Another highly preferred hard monomer that may be employed in the preferred second monomer feed composition includes isobutylmethacrylate. However, any ethylenically unsaturated polymerizable monomer may be employed to prepare the latex polymers of this invention having excellent early print resistance so long as a polymer layer having a gradient polymeric morphology is obtained that continually increases in hard monomer concentration towards the outer surface of the layer.

Another preferred seed polymerized latex polymer of this invention can be prepared, for example, by the series feed embodiment of the process of this invention using a first monomer feed composition having a greater concentration of hard monomers than in the second monomer feed composition, i.e., $T_{g1}$ is greater than $T_{g2}$. Thus, the resulting seed polymerized latex polymer has a surrounding polymer layer having a gradient polymeric morphology that continually decreases in hard monomer concentration towards the outer surface of the layer. The seed polymerized latex polymer prepared in this manner may be used in coatings to advantageously provide a high gloss finish.

The examples which follow are intended as an illustration of certain preferred embodiments of the invention, and no limitation of the invention is implied.

EXAMPLE 1

Preparation of a Polystyrene Seed Latex

A reactor was charged with Dowfax® 2A1 surfactant (a sodium dodecyl diphenyl oxide disulfonate surfactant available from Dow Chemical Co., Midland, Mich.) (333.33 g), ammonium persulfate (0.5 g) and water (757 g). A monomer feed was prepared containing styrene (285 g) and divinylbenzene (15 g). The reactor contents were heated to about 80° C. and that reaction temperature was maintained during the polymerization reaction. The styrene monomer feed was added to the charged reactor at a feed rate of 5 g/min. along with a cofeed of ammonium persulfate (0.8 g) in water (100 g). After introduction of the styrene monomer feed the reaction system was rinsed with water (100 g) and the reactor was held for 1.5 hours. The resulting polystyrene seed latex had a number average particle size of 33±2 nanometers and 34% by weight solids.

EXAMPLE 2

A seed polymerized latex polymer having a gradient polymeric morphology was prepared by emulsion polymerization. The polymerization reaction system consisted of a reactor or emulsion polymerization reaction zone equipped with a stirrer and an inlet to receive polymerizable reactants. A primary feed source or tank was connected via a pump to the inlet of the reactor. A secondary feed source or tank was connected via a pump to the primary feed source. A cofeed source or tank was connected via a pump directly to the reactor.

The reactor was charged with water (244.33 g), a polystyrene seed prepared in the manner described in Example 1 (59.8 g) and JKB anionic surfactant (an alkylated nonyl phenol (30% active) available from Rhone-Poulenc, Inc.) (6.0 g). The reactor contents were heated to about 80° C., ammonium persulfate (2.1 g) was added and stirred for 5 minutes at 80° C. to generate a free radical pulse. A first monomer feed composition contained in the primary feed source consisted of a preemulsion of 2-ethylhexyl acrylate (210 g), methyl methacrylate (2.7 g), divinylbenzene (10.9 g), JKB anionic surfactant (14.0 g) and water (309 g). The addition of the first monomer feed composition to the reactor was started and allowed to run for 25 minutes after which the second monomer feed composition contained in the secondary feed source was fed to the primary feed source and then to the reactor. The second monomer feed composition consisted of styrene (216 g), methyl methacrylate (156 g), methacrylic acid (5.3 g), acrylic acid (4.0 g) and divinylbenzene (10.9 g). A cofeed composition consisting of ammonium persulfate (1.5 g) in water (80 g) was added to the reactor during the addition of the first and second monomer feed composition and the reaction system was rinsed with water (100 g). The reactor contents were maintained at a temperature of about 80° C. during the polymerization reaction. The entire feed was run for 3 hours and then the reactor charge was held for 2 hours. The resulting seed polymerized latex polymer having a gradient polymeric morphology had a number average particle size of 86±2 nanometers, 44.1% by weight solids and a pH of 7.11.

EXAMPLE 3

A seed polymerized latex polymer was prepared in a manner similar to Example 2. The reactor was charged with a polystyrene seed (59.8 g) having a particle size of 35 nanometers, ammonium persulfate (3.6 g), JKB anionic surfactant (6 g) and water (244.3 g). The first monomer feed composition contained 2-ethyl hexyl acrylate (210 g), methyl methacrylate (8 g) and JKB anionic surfactant (14 g) in water (310 g). The second monomer feed composition contained styrene (266.4 g), isobutyl methacrylate (90 g), acrylic acid (4 g) and divinylbenzene (21.8 g). The resulting seed polymerized latex polymer having a gradient polymeric morphology had a number average particle size of 92±2 nanometers, 44.2% by weight solids and a pH of 7.12.

EXAMPLE 4

A seed polymerized latex polymer was prepared in a manner similar to Example 2 with the exception that the first monomer feed composition contained 18 g of JKB anionic surfactant and the second monomer feed composition contained 150 g of methyl methacrylate and 10 g of acrylic acid. The resulting seed polymerized latex polymer having a gradient morphology had a number average particle size of 82±2 nanometers, 45.1% by weight solids and a pH of 7.47.

Comparative Example 1

A polymerization reaction system similar to that described in Example 2 was used with the exception that all the monomers were fed straight to the reactor from the primary feed source without continuously varying the concentration ratio of the monomers. The reactor charge was identical to that of Example 2 while the primary feed source contained a preemulsion consisting of the combined monomers of the first monomer feed composition and the second monomer feed composition. The resulting latex polymer had a number average particle size of 104±2 nanometers, 44.7% by weight solids and a pH of 7.2

Comparative Example 2

A polymerization reaction similar to that of Example 3 was run without latex seed particles. The reactor was charged with water (229.3 g) and JKB anionic surfactant (11.0 g) followed by the addition of ammonium persulfate (2.1 g) in water (15 g). The first monomer feed composition was a preemulsion which contained 2-ethylhexyl acrylate (210.0 g), methacrylic acid (2.2 g) JKB anionic surfactant (14.0 g) and water (308.7 g). The second monomer feed composition contained styrene (266.4 g), isobutyl methacrylate (90.0 g), methacrylic acid (6.3 g), acrylic acid (4.0 g) and divinylbenzene (21.8 g). A cofeed of ammonium persulfate (1.5 g) in water (80.0 g) was also employed. The feed rate was 5.2 g/min. The resulting latex polymer had a number average particle size of 118±2 nanometers, 43.8% by weight solids and a pH of 7.8.

Comparative Example 3

A latex polymer was prepared in a manner similar to that described in Example 2 with the exception that instead of adding a preformed seed the components used to form the latex seed in Example 1 were added to the reactor and polymerized for about one-half hour to form a particle insitu prior to the addition of the first monomer feed composition. The resulting latex polymer had a number average particle size of 81±2 nanometers.

The latex polymers prepared in Examples 2–4 and Comparative Examples 1–3 were used to prepare coating compositions. First, the latex polymers of these examples were diluted to 33% by weight solids with water. This was followed by further dilution to 25% by weight solids with the addition of a coalescing solvent selected from ethylene glycol monobutyl ether (available as Butyl Cellosolve®) or a mixture of dipropylene glycol monomethyl ether (DPM) and dipropylene glycol mono-normal butyl ether (DPnB). Added to each coating solution was approximately 0.5% by weight based on solids of a fluorosurfactant available as Zonyl® FSJ from E. I. du Pont de Nemours & Co., Wilmington, Del.

The compositions were then applied to test substrates by draw down with a #34 Bird bar. Early print resistance tests were conducted by applying each coating composition to glass plates, flash drying the coating for 15 minutes at ambient temperature, followed by drying at 120° F. for 5 minutes and then a 2 hour cool down. A layer of cheesecloth was placed over the dried film and a 2 pound weight was placed thereon for a twenty-four hour period. Then the cheesecloth was removed and the surface visibly observed for deformation. A rating for early print resistance was rendered on a scale of 10 to 0 with 10 being the best, i.e., no sign of deformation or damage and 0 being the worst. The results of this test are set forth in Table 1.

TABLE 1

| LATEX POLYMER | Coalescent Solvent | Early Print Resistance |
| --- | --- | --- |
| Ex. 2 | EB | 8 |
| Ex. 2 | DPM/DPnB | 8* |
| Ex. 3 | EB | 8 |
| Ex. 3 | DMP/DPnB | 4 |
| Ex. 4 | EB | 8 |
| Comp. Ex. 1 | EB | 1 |
| Comp. Ex. 2 | EB | 6.5** |
| Comp. Ex. 2 | DPM/DPnB | 6.5* |
| Comp. Ex. 3 | EB | 6 |
| Comp. Ex. 3 | DPM/DPnB | 2 |

*difficult to read, gel particles
**cracked badly and large amount of grit (~5.5%)
EB — ethylene glycol monobutyl ether
DPM/DPnB — dipropylene glycol monomethyl ether/dipropylene glycol mono-normal butyl ether The early print resistance test results show that the seed polymerized latex polymers having a polymer layer with a gradient polymeric morphology prepared by the process of this invention provide coatings having excellent early print resistance, particularly when the coating coalescent solvent was ethylene glycol mono butyl ether. In contrast, the seed polymerized polymer that did not have a gradient polymeric morphology (Comparative Example 1) lacked any print resistance. In addition, the seed polymerized latex polymers of this invention containing a preformed seed showed significantly better early print resistance over the latex polymer prepared with insitu formed particles (Comparative Example 3).

What is claimed is:

1. An emulsion addition-polymerization process for preparing a seed polymerized latex polymer having a polymer layer with a gradient polymeric morphology, said process comprising the steps of:

(a) introducing (i) latex seed particles having a number average particle size in the range from about 20 nanometers to about 60 nanometers, (ii) an initiator, (iii) a surfactant and (iv) water, to an emulsion polymerization reaction zone;

(b) introducing a first monomer feed composition and a second monomer feed composition simultaneously to the emulsion polymerization reaction zone under polymerization conditions, the first monomer feed composition and the second monomer feed composition each having at least one polymerizable reactant wherein a polymer of the at least one polymerizable reactant of the first monomer feed composition would have a glass transition temperature $T_{g1}$ differing from a glass transition temperature $T_{g2}$ of a polymer of the at least one polymerizable reactant of the second monomer feed composition;

(c) polymerizing the at least one polymerizable reactant of each of the first monomer feed composition and the second monomer feed composition upon introduction to the emulsion polymerization reaction zone; and (d) introducing the first and second monomer feed compositions at different feed rates so as to continuously vary the concentration ratio of the first monomer feed composition to the second monomer feed composition as the first and second monomer feed components are simultaneously introduced to the emulsion polymerization reaction zone to result in a seed polymerized latex polymer having a number average particle size less than about 100 nanometers.

2. A process according to claim 1, wherein the difference between $T_{g1}$ and $T_{g2}$ is greater than 50° C.

3. A process according to claim 2, wherein said latex seed particles are polystyrene latex seed particles.

4. A process according to claim 3, wherein said latex seed particles have a number average particle size in the range from about 25 to about 40 nanometers.

5. A process according to claim 4, wherein at least one of said first monomer feed composition and said second monomer feed composition contains a crosslinking agent.

6. A process according to claim 5, wherein the concentration ratio is continuously varied by introducing said second monomer feed composition from a secondary feed source to a primary feed source containing said first monomer feed composition while simultaneously introducing the second monomer feed composition and said first monomer feed composition contained in said primary feed source to said emulsion polymerization reaction zone.

7. A process according to claim 6, further comprising introducing a portion of the first monomer feed composition to the emulsion polymerization reaction zone prior to simultaneously introducing the second monomer feed composition from the secondary feed source to the primary feed source.

8. A process according to claim 7, wherein $T_{g2}$ is greater than $T_{g1}$.

9. A process according to claim 7, wherein $T_{g1}$ is greater than $T_{g2}$.

10. A process according to claim 8, wherein the first monomer feed composition is a preemulsion and the at least one polymerizable reactant of the first monomer feed composition is selected from the group consisting of 2-ethylhexyl acrylate, methacrylic acid and mixtures thereof.

11. A process according to claim 10, wherein the at least one polymerizable reactant of the second monomer feed composition is selected from the group consisting of styrene, methyl methacrylate, methacrylic acid, acrylic acid, isobutyl methacrylate and mixtures thereof.

12. A process according to claim 5, wherein the concentration ratio is continuously varied by separately introducing said first monomer feed composition contained in a first primary feed source and said second monomer feed composition contained in a second primary feed source directly to said emulsion polymerization reaction zone and continuously varying a feed rate of at least one of said first monomer feed composition and said second monomer feed composition.

13. A process according to claim 12, further comprising introducing a portion of said first monomer feed composition to said polymerization reaction zone prior to simultaneously introducing said second monomer feed composition to said polymerization reaction zone.

14. A process according to claim 13, wherein the step of continuously varying the feed rate of at least one of said first monomer feed composition and said second monomer feed composition is computer controlled.

15. A process according to claim 14, wherein the feed rates of both said first monomer feed composition and said second monomer feed composition vary inversely.

16. A process according to claim 15, wherein $T_{g2}$ is greater than $T_{g1}$.

17. A process according to claim 15, wherein $T_{g1}$ is greater than $T_{g2}$.

18. A seed polymerized latex polymer comprising a latex seed core, said core having a number average particle size in the range from about 20 nanometers to about 60 nanometers, and a polymer layer with a gradient polymeric morphology surrounding the seed core, the seed polymerized latex polymer having a number average particle size less than about 100 nanometers.

19. A seed polymerized latex polymer according to claim 18, wherein said latex seed core is a polystyrene seed core.

20. A seed polymerized latex polymer according to claim 19, wherein said latex seed has a number average particle size in the range from about 25 nanometers to about 40 nanometers.

21. A seed polymerized latex polymer according to claim 20, wherein said polymer layer with the gradient polymeric morphology has a continuously increasing concentration of hard monomers in the direction toward the outer surface of the polymer layer.

22. A seed polymerized latex polymer according to claim 21, wherein said polymer layer is comprised of at least two polymerized ethylenically unsaturated polymers selected from the group consisting of 2-ethylhexyl acrylate, methacrylic acid and styrene, methyl methacrylate, acrylic acid and isobutyl methacrylate.

23. A wood coating composition comprising the seed polymerized latex polymer according to claim 18 and a coalescent solvent.

24. A seed polymerized latex polymer having a polymer layer with a gradient polymeric morphology prepared by the process comprising the steps of:

(a) introducing (i) latex seed particles having a number average particle size in the range from about 20 nanometers to about 60 nanometers, (ii) an initiator, (iii) a surfactant and (iv) water, to an emulsion polymerization reaction zone;

(b) introducing a first monomer feed composition and a second monomer feed composition simultaneously to the emulsion polymerization reaction zone under addition polymerization conditions, the first monomer feed composition and the second monomer feed composition each having at least one polymerizable reactant wherein a polymer of the at least one polymerizable reactant of the first monomer feed composition would have a glass transition temperature $T_{g1}$ differing from a glass transition temperature $T_{g2}$ of a polymer of the at least one polymerizable reactant of the second monomer feed composition;

(c) polymerizing the at least one polymerizable reactant of each of the first monomer feed composition and the second monomer feed composition upon introduction to the emulsion polymerization reaction zone; and (d) introducing the first and second monomer feed compositions at different rates so as to continuously vary the concentration ratio of the first monomer feed composition to the second monomer feed composition as the first and second monomer feed compositions are simultaneously introduced to the emulsion polymerization reaction zone to result in a seed polymerized latex polymer having a number average particle size less than about 100 nanometers.

* * * * *